United States Patent [19]

Halma et al.

[11] 4,147,301

[45] Apr. 3, 1979

[54] HEATING SYSTEM

[76] Inventors: Wayne G. Halma, 421 E. 7th; Dale A. Snyder, 918 W. 7th, both of Mitchell, S. Dak. 57301

[21] Appl. No.: 787,498

[22] Filed: Apr. 13, 1977

[51] Int. Cl.² .............................................. F24D 3/00
[52] U.S. Cl. ..................................... 237/8 R; 237/56; 126/101; 432/175; 122/367 R
[58] Field of Search ............ 237/8 R, 63, 56, 59, 237/62; 126/101; 122/367 R, 367 C; 432/169, 175

[56] References Cited

U.S. PATENT DOCUMENTS

| 277,534 | 5/1883 | Bailey | 237/56 |
|---|---|---|---|
| 1,826,950 | 10/1931 | Paige | 237/8 R |
| 1,937,909 | 12/1933 | Paige | 237/8 R |
| 2,311,350 | 2/1943 | Richardson | 432/175 |
| 2,573,364 | 10/1951 | Scharff | 126/101 |
| 3,147,960 | 9/1964 | Ruff | 432/175 |
| 3,254,839 | 6/1966 | McClanahan et al. | 237/8 R |
| 3,563,212 | 2/1971 | Hoagland | 122/367 R |
| 3,890,936 | 6/1975 | McQuerney et al. | 237/8 R |
| 3,916,991 | 11/1975 | Trump | 126/101 |
| 4,055,152 | 10/1977 | Vidalenq | 122/367 C |

Primary Examiner—Henry C. Yuen
Attorney, Agent, or Firm—Larson, Taylor and Hinds

[57] ABSTRACT

A heating system comprises serially connected heating and holding coils connected in a closed heating liquid circulating circuit with a collector coil at the space to be heated. The heating and holding coils are disposed in a compartment wherein both are subject to direct heating by one or more gas burners, and flue gas is drawn through the compartment in heat exchange relation with the holding coil before being exhausted.

12 Claims, 2 Drawing Figures

HEATING SYSTEM

This invention relates to heating systems that burn gas and particularly to closed circuit systems of this type having special arrangements for heating a liquid to be circulated.

The invention contemplates a highly efficient gas burner energized system wherein a heating liquid is passed through heating and holding coils disposed in special heat exchange relationship with one or more gas burners whereby heat derived by conduction and radiation from the burners and by passage of the flue gases through the holding coil prior to exhaust is cumulatively utilized to heat the liquid, and this is a major object of the invention.

The invention further contemplates passing the liquid so heated through a closed circuit including a heat collector coil assembly disposed to selectively impart heat to space to be heated, together with associated controls for preheating the liquid in the circuit to a desired temperature and automatically activating components of the system to perform their sequential functions, and this is a further object of the invention.

More detailed objects of the invention include insulated heating compartment construction embodying special arrangements of serially connected heating and holding coils relative to the burner or burners, and an associated perforated compartment wall structure whereby flue gases from the burners may be drawn in heat exchanges relation through at least the holding coil before exhaust through the perforated walls.

Further objects of invention will appear in connection with the appended claims and the annexed drawings.

PREFERRED EMBODIMENTS

The illustrated system comprises two burner assemblies 11 and 12 disposed in a compartment 13 at opposite sides of a holding coil 14, with heating coils 15 and 16 serially connected to the holding coil and disposed between the respective burners and the holding coil.

Figure 2:
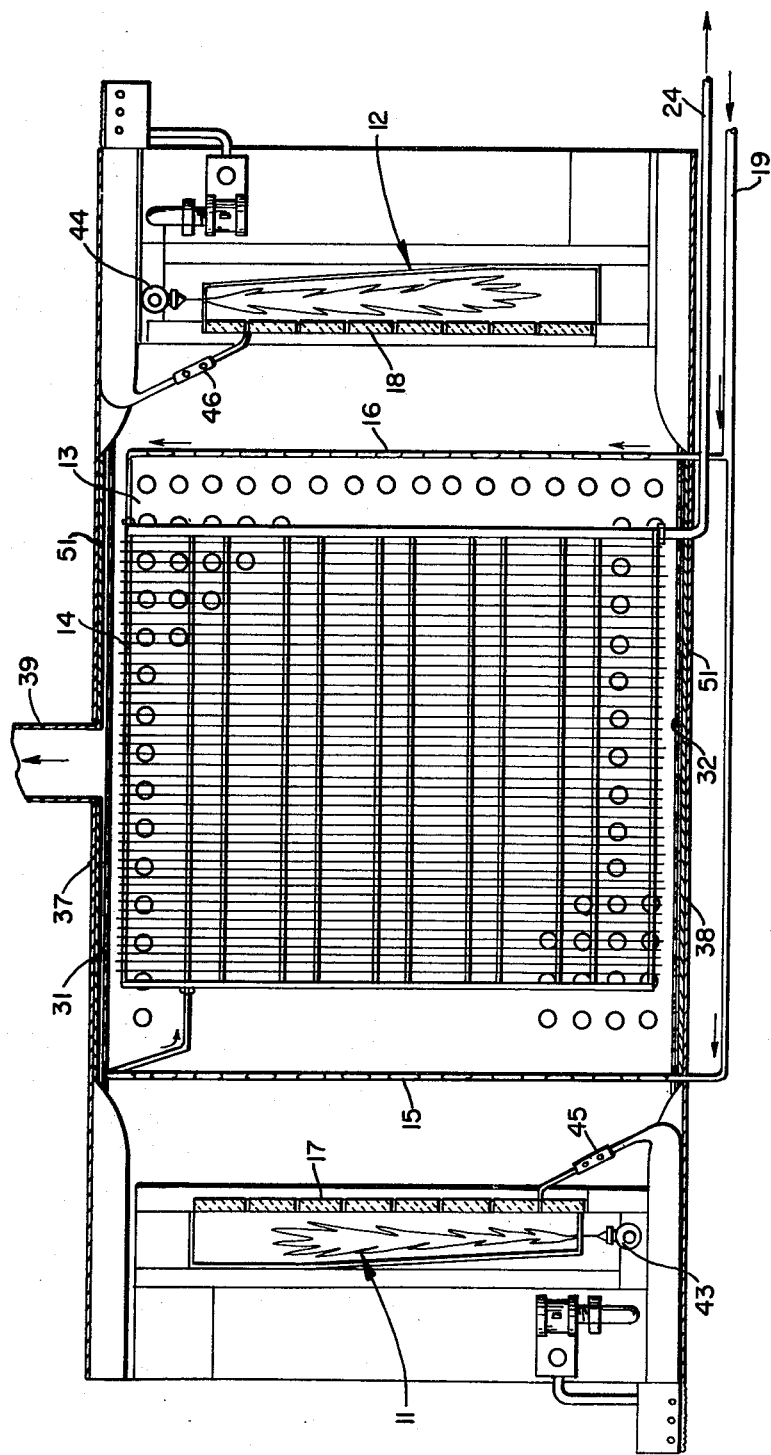
FIG. 2 is a partly diagrammatic view showing preferred physical relationships of the parts of the heat generating portion of the system.

In a preferred structure such as shown in FIG. 2, holding coil 14 is composed of copper or other suitable metal tubing carrying thin heat conductive fins; and the respective burner assemblies are gas burners having high heat conductive perforated ceramic walls 17 and 18 facing into the compartment, with heating coils 15 and 16 being sinuous lengths of copper or like metal tubing preferably mounted directly on the perforated burner walls or immediately adjacent thereto.

As shown, adjacent ends of heating coils 15 and 16 are connected to one end of the holding coil 14. The other end of holding coil 14 is connected to a heating liquid supply line 19 connected through a motor driven pump 21 to one end of a heat collector coil 22. The other ends of heating coils 15 and 16 are connected to a heating liquid return line 24 connected to the other end of the heat collector coil. The heating liquid may be water or any other liquid capable of being heated without deterioration of the system components.

The foregoing coils and lines constitute a closed circuit (can be a closed circuit of an open circuit with expansion tank mounted outside combustion chamber on hot line 19) that is filled with a heating liquid. The volumetric capacity of holding coil 14 is preferably about equal to that of collector coil 22.

An aqastat or equivalent heat sensitive device 25 in the circuit in or adjacent heat collector coil 22 is connected to a control device 20 for simultaneous actuation or deactivation of pump 21 and the burners, as will appear.

Heat collector coil 22 as shown may be disposed in an enclosure 26 in the building containing a motor driven fan 27 and connected to the conventional hot air ducting 28 leading to the space or spaces to be heated. A thermostat 29 in that space is connected to selectively operate the fan to force air through the heat collector coil as will appear.

Preferably lines 19 and 24 are heavily covered with heat insulation where they extend between compartment 13 and enclosure 26. That is true whether the compartment 13 is located outside the building as shown, or within the same building which is an important phase of the invention that decreases the extent of heat insulation required for compartment 13.

The disposition and heating of the heating and holding coils is a very important phase of the invention. As disclosed above the heating coils 15 and 16 may be in direct heat conductive contact or at least in closely adjacent radiant heat exchange with the ceramic walls 17 and 18 of the burners, both the heating coils and holding coil 14 being exposed to direct radiant heat from the perforated burner walls.

Additionally it will be noted that the inner top wall 31, inner bottom wall 32 and the inner front and rear walls 33 (rear wall only shown in FIG. 1) that partly bound the compartment 13 are perforated stainless steel or other rigid metal plates. The compartment inner side walls 35 and 36 on which burner assemblies 11 and 12 are mounted are preferably imperforate stainless steel plates. The outer top wall 37, outer bottom wall 38 and outer front and rear walls (not shown) are also imperforate stainless steel plates. All of these imperforate plates are joined at their edges so that the outer walls define a complete outer jacket enclosure that is imperforate except for flue gas outlet 39, combustion air inlets such as the louvers indicated at 41 and 42, arrangements for introducing the gas conduits to gas burners 43 and 44 and electrical wires for spark discharge igniters 45 and 46 of the burners.

Figure 1:
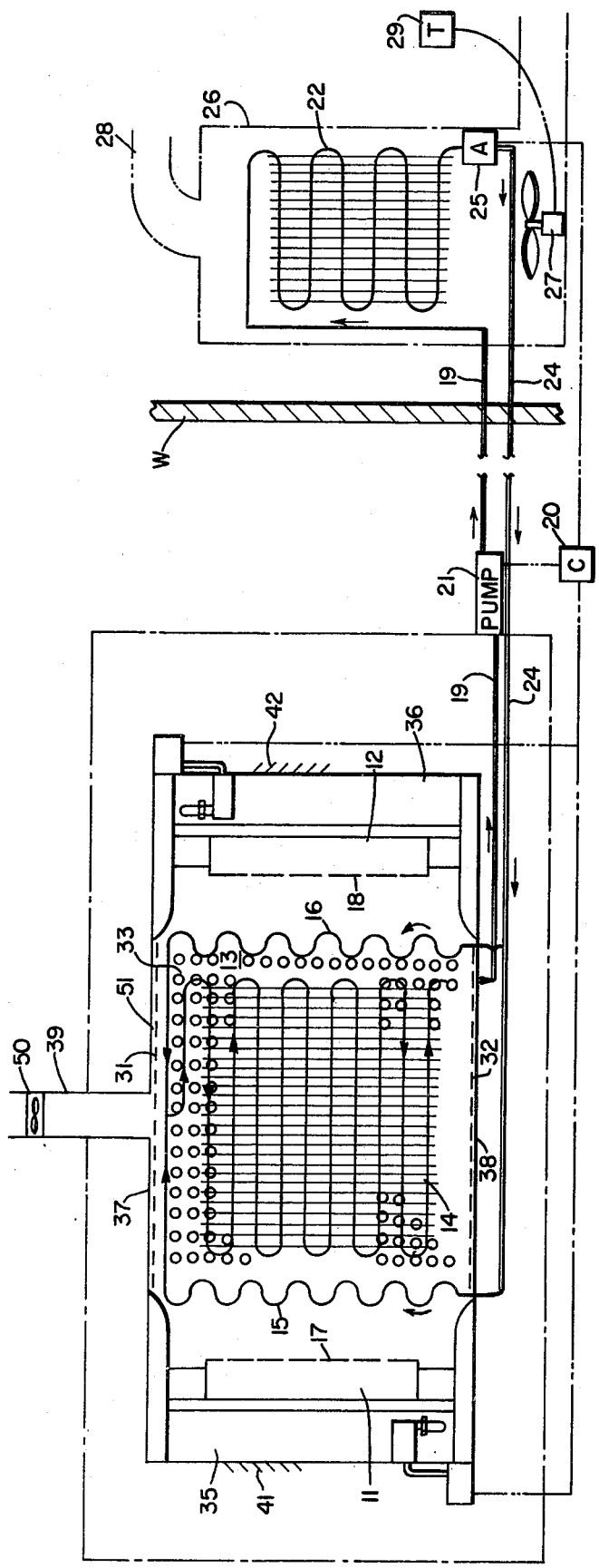
FIG. 1 is a diagrammatic view illustrating the heating system of the invention according to a preferred embodiment.

FIG. 1 shows an exhaust fan assembly 50, which when idle closes and seals off flue outlet 39, and the motor of fan 50 is suitably connected to operate the fan to withdraw flue gas only when the gas burners are energized. When fan 50 rotates the products of combustion including the flue gas are pulled into compartment 13 through the perforations in burner walls 17 and 18 and circulated through the compartment in heat exchange relation with the finned holding coil 14 before being drawn out through the perforated metal walls around the compartment. Preferably a layer 51 of asbestos or like heat insulation, lines all of the imperforate plates and there is a small space between that layer and the adjacent perforated plates providing passage so that the flue gas drawn through the perforated plates travels through that passage to exit at 39.

As shown in chain lines in FIG. 1 the entire compartment structure is disposed in a heavily insulated enclosure, and may be located externally of the building wall W. Alternatively it may be disposed internally of the building wherein the collector coil is mounted. In either event the liquid heating portion of the system is essentially a separate unit capable of being factory made and shipped to a point of use for installation in coaction with existing ducting in a building.

The term coil is meant to include substantially all passage forming structures for equivalently circulating the heating liquid. While a two burner system is specifically disclosed, the invention contemplates a system using one burner and one heating coil associated with the holding coil.

The foregoing structure and mode of operation has been found to be unexpectedly efficient. In an existing system a building containing about 5400 square feet of floor space has been heated successfully in the rigorous climate of South Dakota. The heating liquid was preheated to about 180° F. and the pump and burners were activated, when the temperature reached about 145° at the collector coil and cut off when the temperature in there again reached about 180°.

The remarkable efficiency of about at least 35 to 50 per cent more efficiency for a properly installed and operated system is claimed.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A heating system having communicating means leading to space to be heated comprising means defining a closed compartment with at least one gas burner assembly disposed in the compartment, said burner assembly having a high heat conducting and radiating flue gas discharge wall facing the interior of said compartment, said wall containing multiple perforations, a heating coil in said compartment at least in closely adjacent radiant heat exchange with said wall and extending planar to and substantially the length of said wall, a holding coil in said compartment positioned separate from and inwardly of said heating coil and connected at one end to one end of said heating coil, a heat collector coil disposed in an enclosure in said space to be heated connected to said ducting, means for forcing air to be heated over said heat collector coil into said ducting, a heating liquid supply conduit connecting the other end of said holding coil to one end of said heat collector coil, a heating liquid return conduit connecting the other end of said heat collector coil to the other end of said heating coil, thus providing a closed circuit between and including said coils containing a heating liquid, a motor driven pump in said supply line adapted when actuated to force liquid from said holding coil toward said heat conduit, means responsive to a drop in the temperature in said heat collector coil below a predetermined lower value for energizing said burner and actuating the pump to circulate heating fluid through said circuit and for stopping such circulation and inactivating the burner when that temperature raises to a predetermined higher value, said heating and holding coils being subject to direct heating from said burner and there being means at said compartment for forcing hot flue gases from said burner through said holding coil before exhaust.

2. In the heating system defined in claim 1, there being two of said burner assemblies in said compartment at opposite sides of said holding coil, and there being a heating coil between each burner assembly and the holding coil.

3. In the heating system defined in claim 2, adjacent ends of said heating coils being connected to said one end of the holding coil, and the other ends of said heating coils being connected to said return line.

4. In the heating system defined in claim 1, said means for forcing hot flue gas through said holding coil comprising side walls of said compartment formed with a plurality of perforations and passage means behind said side walls leading to a flue exhaust device.

5. The heating system defined in claim 1, wherein said compartment is outside the space to be heated.

6. The heating system defined in claim 1, wherein said compartment is inside the space to be heated.

7. In the heating system defined in claim 6, means for actuating said burner and pump for preheating the liquid in said circuit to a predetermined value, and there being means responsive to the temperature in said space for activating said means for forcing air through the collector coil.

8. In the heating system defined in claim 1, said heating coil being mounted in direct heat conductive relation upon said perforated burner wall.

9. In the heating system defined in claim 1, said heating coil being mounted immediately adjacent said perforated burner wall.

10. In the heating system defined in claim 1, said perforated burner wall being ceramic.

11. In the heating system defined in claim 1, said holding coil and heat collector coils having substantially equal volumetric capacities.

12. A heating system as defined in claim 1 wherein the heating coil is in the form of a sinuous length of metal tubing.

* * * * *